United States Patent [19]

Galloway

[11] Patent Number: 4,557,858

[45] Date of Patent: Dec. 10, 1985

[54] METHOD OF MAKING AN ELECTRONICALLY CONDUCTIVE TECTOSILICATE, AND SUCH TECTOSILICATE WHEN MADE ACCORDING TO THE METHOD

[75] Inventor: Roy C. Galloway, Pretoria, South Africa

[73] Assignee: Lilliwyte Societe Anonyme, Luxembourg

[21] Appl. No.: 474,989

[22] Filed: Mar. 14, 1983

[30] Foreign Application Priority Data

Apr. 15, 1982 [ZA] South Africa ................. 82/2573

[51] Int. Cl.$^4$ ................. H01B 1/16; C01B 33/28; C01B 33/32
[52] U.S. Cl. ................. 252/508; 29/623.1; 29/623.5; 252/503; 252/506; 252/507; 252/512; 252/518; 252/182.1; 423/328; 423/332; 429/50; 429/103; 429/104; 429/112; 429/191; 429/192; 429/193; 429/199; 429/218; 429/245
[58] Field of Search ............... 252/518, 503, 506, 507, 252/508, 512, 182.1; 429/103, 112, 199, 191, 192, 193, 218, 245, 50, 104; 423/328, 332; 29/623.1, 623.5

[56] References Cited

U.S. PATENT DOCUMENTS 4,164,698  8/1979  Coetzer ................. 429/50
4,287,268  9/1981  Coetzer ................. 429/103

FOREIGN PATENT DOCUMENTS 1188873  4/1970  United Kingdom .
1555648  11/1979  United Kingdom .

OTHER PUBLICATIONS

Charnell, "Gel Growth of Large Crystals of Sodium A and Sodium X Zeolites", J. of Crystal Growth, 8 (1971) 291-294.

*Primary Examiner*—A. Lionel Clingman
*Assistant Examiner*—Robert A. Way
*Attorney, Agent, or Firm*—Arnold, White & Durkee

[57] ABSTRACT

The invention provides an electronically conductive tectosilicate which has, trapped within and forming part of its framework structure at the molecular or atomic level, colloidal particles of one or more electronically conducted species, which act to render the tectosilicate electronically conductive. The invention further provides a method of making such electronically conductive tectosilicate, wherein, for example, a zeolite is precipitated from the solution which has an electronically conductive species such as colloidal graphite in suspension therein, so that the colloidal particles of the electronically conductive species are trapped within and form part of the framework structure of the precipitate at the atomic or molecular level. The invention also extends to electronically conductive artifacts, such as electrodes for electrochemical cells, which are made from the electronically conductive tectosilicate by compacting the artifact from particles of the tectosilicate.

16 Claims, 3 Drawing Figures

METHOD OF MAKING AN ELECTRONICALLY CONDUCTIVE TECTOSILICATE, AND SUCH TECTOSILICATE WHEN MADE ACCORDING TO THE METHOD

This invention relates to an electronically conductive tectosilicate or framework silicate and method of making it; to a method of making an electronically conductive tectosilicate artifact from the tectosilicate; and to a method of making an electrode for an electrochemical cell from the tectosilicate or artifact.

According to the invention there is provided an electronically conductive tectosilicate which has, trapped within and forming part of its framework structure at the molecular or atomic level, colloidal particles of one or more electronically conductive species, which act to render the tectosilicate electronically conductive.

Tectosilicates to which the invention can be applied will be selected from the class of substances known as framework silicates and may be crystalline or non-crystalline/ amorphous. Such silicates include:
zeolites,
felspars,
felspathoids, and
other silicates such as silica gel.
Such silicates are of a structural type in which all four oxygen atoms of each of the silicate tetrahedra are shared with neighbouring tetrahedra. The framework of the tectosilicate is made up of silicon atoms with in some cases aluminium atoms, together with other atoms. For the present invention tectosilicates also include mixtures of or analogues of tectosilicates in which the silicon and/or the aluminium atoms of the framework may be substituted, amongst others, by atoms of one or more of:
iron
beryllium
boron
phosphorous
carbon
germanium and
gallium,
in major or minor proportions.

It is contemplated that the invention will usually be concerned with felspars, and particularly, felspathoids and zeolites, being tectosilicates which can be crystalline or amorphous and which contain silicon and aluminium in fairly definite proportions, and their analogues. They are usually possessed of a reasonably ordered internal structure, exhibit a high internal surface area and are characterized by the presence of a multiplicity of regular arrays of molecular cavities, i.e. channels and/or cavities in their interiors which are interconnected and which open out of their surface via windows and/or pores.

The electronically conductive species may be any substance capable of forming a colloidal dispersion in the framework structure of the tectosilicate, and which has the necessary electron conductive properties for its intended use in the tectosilicate product formed.

The electronically conductive species may be selected from the group consisting in carbon, the transition metal chalcogenides, intercalation compounds of carbon and intercalation compounds of said chalcogenides. The electronically conductive species may thus be selected from the group consisting in graphite, $MoS_2$, $TiS_2$, $TaS_2$, $CrS_2$, $ZrSe_2$ and $TiSe_2$.

The colloidal particles may have a particle size of not more than 1 micron, and may make up from 2 to 15% by mass of the tectosilicate.

Further according to the invention there is provided a method of making an electronically conductive tectosilicate as described above, which comprises precipitating the tectosilicate from a solution which has an electronically conductive species in colloidal form in suspension therein, so that the colloidal particles of the electronically conductive species are trapped within and form part of the framework structure of the precipitate at an atomic or molecular level.

When the precipitate is crystalline, the conductive species will be trapped within and form part of the crystals formed.

As mentioned above, the tectosilicates may be selected from the group consisting in zeolites, felspathoids, felspars and silica gel, particularly zeolites and felspathoids.

Likewise, the electronically conductive species may be selected from the group consisting in carbon, the transition metal chalcogenides, intercalation compounds of carbon and intercalation compounds of said chalcogenides, eg. graphite, $MoS_2$, $TiS_2$, $TaS_2$, $CrS_2$, $ZrSe_2$ and $TiSe_2$.

The colloidal particles in the suspension have a particle size of not more than 1 micron, and the solution may be an aqueous solution.

During precipitation or crystallization the colloidal suspension particles combine in a more or less coherent fashion with the growing tectosilicate particles or crystals. During initial crystal growth it has been observed that tectosilicate crystallites are formed of such a size that they precipicate under their own weight, together with particles of the colloidal suspension to leave a clear mother liquor.

In experiments involving colloidal graphite and zeolites 4A and 13X crystallized from aqueous solutions, up to 15% by mass of the graphite has been incorporated into the final product, i.e. the graphite makes up up to 15% by mass of the crystals obtained. The crystals obtained were black instead of the more usual white. It is believed that there may be an upper limit to the proportion of electronically conductive colloid which can be incorporated into tectosilicates before crystallinity is adversely affected, probably depending on the physical and chemical nature of the electron conductive species used.

As described in more detail hereunder, various techniques are available to precipitate or crystallize the tectosilicates from aqueous solutions. An aqueous concentrated suspension of the colloid in question will be mixed or dispersed into the solution from which the precipitation will take place, prior to the precipitation, so that the colloidal particles are evenly dispersed therein prior to the start of the precipitation. The applicant has found that routine experimentation easily determines what proportion or quantity of the colloid is taken up in the precipitate, simply by measuring the proportion of colloid left over in suspension when the precipitation is completed, compared with the quantity of colloid at the start. In this way, the quantity of starting colloid needed to ensure that the precipitate obtained contains the desired proportion of colloid incorporated therein, can readily be determined in each case for a particular set of starting materials and volume of solution. The same applies to the quantities of tectosilicate precursor materials required.

Thermogravimetric analysis tests were carried out on certain of the zeolite 4A and 13X crystals produced, incorporating colloidal graphite available from Acheson Colloid Company, Prince Rock, Plymouth, under the Trade Mark "Aquadag". These tests were conducted to obtain information on the nature of the graphite incorporation into the zeolite crystals, and the effect thereof on the internal void volume in the crystals.

From several tests on samples employing varying proportions of Aquadag, it was found that to the first order of magnitude the presence of the graphite had no significant effect on the internal void volume of such crystals after dehydration thereof. Confirmatory tests whereby sulphur was sorbed into the voids of the crystals showed no significant difference when compared with sulphur sorption into similarly prepared crystals omitting the graphite, and the amount sorbed was exactly commensurate with the expected void volume, as estimated by Barrer and Whiteman (J. Chem. Soc. (A)(1967) pages 13–18).

The applicant has found that dehydrated zeolites, and other tectosilicates which do not contain water, are in general bad electronic conductors. This mitigates against their use as electrodes in electrochemical cells, as electrodes must by definition be electrically conducting.

In the past the applicant has attempted to render tectosilicates such as zeolites electronically conductive by coating the outside of crystals thereof with a conducting medium. Techniques for employing this involve ball milling the crystals together with graphite powder, colloidal graphite or molybdenum disulphide; cracking an organic resin to form a carbon coating on the crystals; cracking an organic vapour to form the carbon coating; and cracking a metal carbonyl in vacuo to deposit a suitable conductive coating which may include a metal. The applicant has also employed impregnation of the dehydrated zeolite with a conducting species such as sodium, nickel or iron, which may or may not be electrochemically active when the zeolite crystals are employed to form an electrode for an electrochemical cell.

These prior techniques employed by the applicant provide a tectosilicate-based electrode with adequate electron conductivity, but this conductivity has been found to be insufficient when extremely high power densities and energy densities are required, for example in automotive applications. In the coating technique, it has been found that it is difficult to obtain a continuous, well-defined coating which is coherently attached to the tectosilicate surface, and in the impregnation technique, there is the limitation that a relatively large amount of electronically conducting species must be added to the tectosilicate, which occupies a proportion of the internal volume of the tectosilicate crystals, which could otherwise be used to sorb the electrochemically active species, such as sulphur, which together with the tectosilicate makes up the electrode.

The present invention, in contrast, enables tectosilicates to be formed having a substantially higher electronic conductivity, while at the same time employing substantially less of the electronically conductive species. At the same time the molecular sieve characteristics of the tectosilicates, which characteristics are necessary for the sorption of the electrochemically active species when the tectosilicates are employed as electrodes, remain substantially unaffected for this purpose.

The invention extends to electronically conductive tectosilicates when made according to the method described herein.

The invention extends further to a method of making an electronically conductive tectosilicate artifact from an electronically conductive tectosilicate according to the present invention as described above, which comprises compacting a plurality of particles of said tectosilicate under pressure to form a unitary artifact.

The compacting may be by way of isostatic or uniaxial pressing, of the particles by themselves or mixed together with a particulate binder. Suitable binders include organic binders that coke at low temperatures, i.e. below about 650° C., to form open carbon structures of high strength and high electrical conductivity. The compacted artifact so obtained may be fired in a vacuum or inert gas furnace up to a temperature sufficient to crack any binder employed, and sufficient to dehydrate the tectosilicate when, for example if it is a zeolite, it contains bound water. The temperature however should be insufficient to cause any substantial breakdown of the tectosilicate structure. After firing, the tectosilicate artifact may then, if desired or if necessary, be machined to size.

Conveniently thus, a carbonaceous binder is selected which cracks within the temperature range within which the tectosilicate, if it contains bound water or water of crystallization such as with zeolites, loses its water of crystallization. The carbon obtained from the cracking can then act to bind the tectosilicate particles together. When a suitable organic binder is chosen, the carbon residue from cracking can be arranged to have an open microporous active carbon structure, which can be advantageous when the artifact is intended for use as an electrode in an electrochemical cell, as described hereunder.

When intercalation compounds of graphite and chalcogenide layered structures are used as the electronically conductive colloid in forming the particles of the invention, it should be noted that such intercalated species break down at moderate temperatures, which may set a limit on the cracking temperatures of binders, when the particles are used in artifacts.

It is contemplated that the electronically conductive tectosilicates and artifacts formed therefrom can have novel and enhanced utility, where electronic conductivity and improved thermal conductivity are desirable, for example when zeolites are used as catalysts in the petrochemical field. It is further contemplated that they can have utility when doped with suitable semiconductors sorbed into the voids thereof, as electrode structures for photovoltaic and thermoelectric devices. It is believed that they will also have utility as electrode structures for use with liquid catholytes, and as electrodes for fuel cells, being generally unimpregnated in the latter application.

It is contemplated, however, that a prime area of use will be in electrode structures in electrochemical storage cells, where their electronic conductivity and capacity to sorb electrochemically active species is highly valuable.

The invention thus extends also to an electronically conductive tectosilicate artifact whenever made according to the method as described above.

Figure 1:
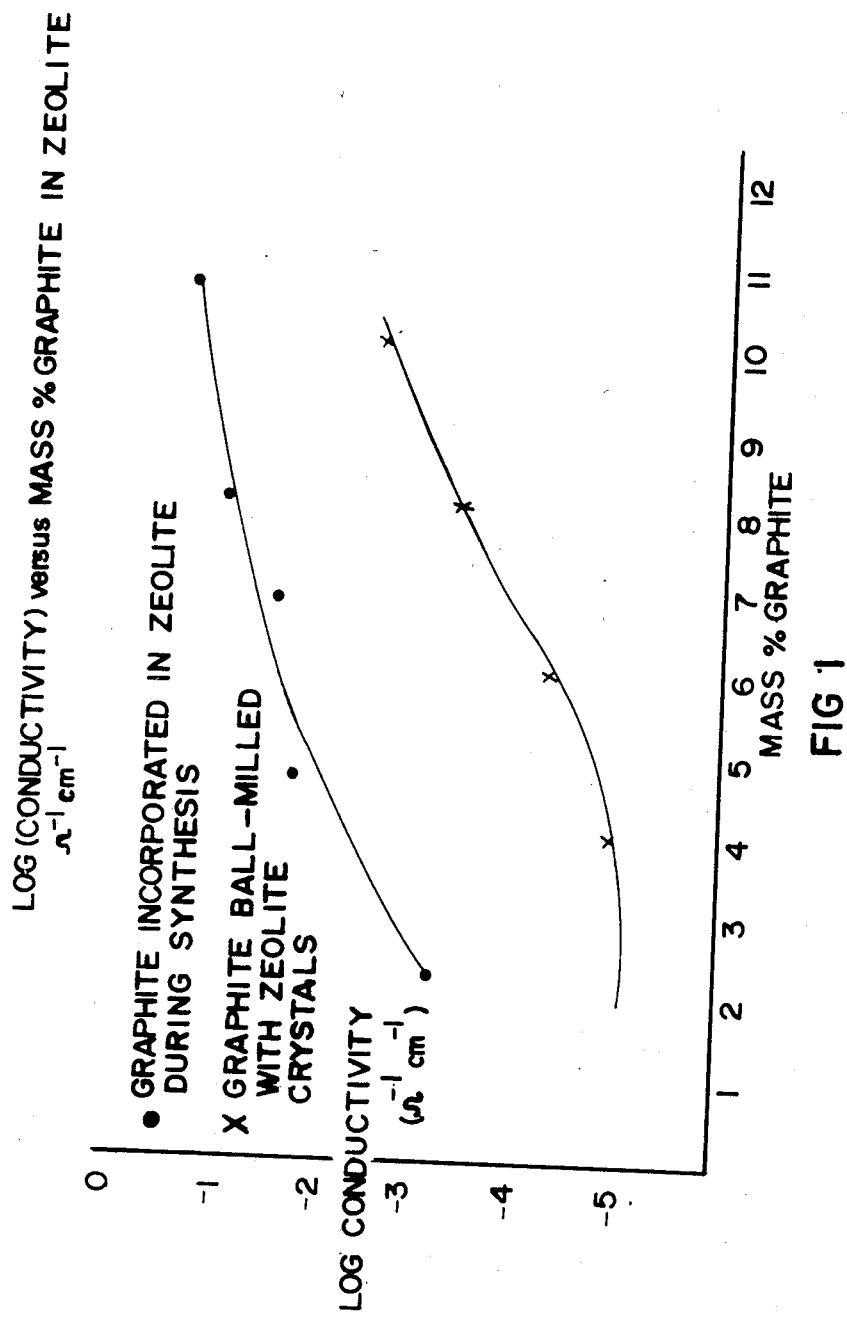
FIG. 1 shows a plot of conductivity on a logarithmic scale against the proportion of graphite used, for both sets of pellets of EXAMPLE 1.

Electrical conductivity of compacts made in accordance with the present invention was compared with electrical conductivity of compacts made by merely mixing zeolite crystals and colloidal graphite, and the results are set out in the following non-limiting example, Example 1.

EXAMPLE 1

Zeolite 13X was crystallized according to the method of Charnell (Journal of Crystal Growth, 8 (1971), pages 291–294) from various aqueous solutions containing Aquadag colloidal suspensions mixed therein.

In each case a solution was prepared in an unused polyethylene beaker containing a 100g $Na_2SiO_3.9H_2O$ and 100ml triethanolamine in 700 ml distilled water. To this solution the appropriate quantity of Aquadag was added. Similarly, a second solution was prepared containing 40 g $NaAlO_2.3H_2O$, together with 1.25 g of zeolite 13X crystals to act as seeds, and 100 ml triethenolamine in 700 ml distilled water.

The first solution was in each case vigorously stirred while the second solution was slowly added. Stirring was continued for 5 minutes after addition, and a gel was formed having a pH of about 12. In each case the beaker was covered with a polyethylene film to prevent rapid evaporation of water and the beaker was subsequently placed in a temperature-controlled water bath at 80° C. for a period of 10 days to complete the zeolite crystal growth. In each case resulting zeolite crystals were obtained which were black in appearance, and no free graphite or residual graphite deposits were noticed. A yield of about 27 to 28 g of zeolite/graphite crystals was obtained in each case. Electron-microscope photographs showed that the product comprised mainly zeolite 13X.

The black zeolite crystals according to the present invention so obtained were washed, dried and subjected to thermogravometric analysis to determine the amount of graphite incorporated in the crystals. These were then mixed with a few percent by mass (sufficient only for adequate binding) of a phenol formaldehyde resin binder (obtainable from Polyresin Products (Proprietary) Limited). Pellets were pressed therefrom in a uniaxial press at $1,36 \times 10^5$ kPa and the resin cured and cracked at a temperature of 650° C. under vacuum. Crystals containing various proportions by mass of graphite were prepared in this way.

Control pellets were prepared from zeolite 13X crystals crystallized in the same fashion but omitting the colloidal graphite in the mother liquor. Instead, the crystals were ball milled with the Aquadag in various proportions mixed with a few percent of the same binder, after which pellets were pressed and the binder cured in the same fashion.

The conductivity of the resulting pellets was measured and the results are set out in the following tables, Tables I and II, and in the accompanying drawing, FIG. 1, which shows a plot of conductivity on a logarithmic scale against the proportion of graphite used, for both sets of pellets.

TABLE 1

| (Pellets according to the invention) | | |
|---|---|---|
| Mass % graphite (Aquadag) | Conductivity (ohms$^{-1}$cm$^{-1}$) | Log Conductivity |
| 2,3 | $6,4 \times 10^{-4}$ | −3,194 |
| 4,7 | $1,6 \times 10^{-2}$ | −1,796 |
| 6,9 | $2,4 \times 10^{-2}$ | −1,620 |
| 8,12 | $7,0 \times 10^{-2}$ | −1,155 |
| 10,6 | $1,99 \times 10^{-1}$ | −0,701 |

TABLE 11

| (Control pellets) | | |
|---|---|---|
| Mass % graphite (Aquadag) | Conductivity (ohms$^{-1}$cm$^{-1}$) | Log Conductivity |
| 2 | $8,5 \times 10^{-6}$ | −5,071 |
| 4 | $1,3 \times 10^{-5}$ | −4,896 |
| 6 | $5,2 \times 10^{-5}$ | −4,285 |
| 8 | $4,2 \times 10^{-4}$ | −3,377 |
| 10 | $3,2 \times 10^{-3}$ | −2,495 |

From the above tables and particularly from FIG. 1, the enhanced electrical conductivity of the pellets of Table 1 compared with the prior art control of Table 2 is apparent.

When compared with prior alternative agents used for solutions, such as rigid porous carbon structures, loose mixtures of graphite or carbon, or graphite or carbon fibres or felts, the tectosilicates and artifacts of the present invention have the advantages that composite artifacts made from electronically conductive tectosilicates with cracked binders are strong and sufficiently robust to withstand thermal and mechanical shocks. They are in this regard stronger than most porous carbon artifacts. The composite artifacts, when made by compaction of tectosilicates according to the invention with binders such as phenol formaldehyde can have an exellent green strength, so that they can be readily machined in their green condition to form complex shapes. Finally, in addition to the fact that the tectosilicates and artifacts of the present invention have been found to have a greater electronic conductivity than most similar alternatives, the tectosilicate content can be chosen, for example when employing zeolites, so that they are far more selective in regulating chemical side reactions that can occur when other molecular sieves such as porous carbons are used.

The invention extends still further to a method of making an electrode for an electrochemical cell from an electronically conducting tectosilicate as described above, or from an artifact as described above, which comprises sorbing an electrochemically active electrode substance into the internal volume of the tectosilicate, so that the electrochemically active substance is sorbed and held captive therein in dispersed form for effective use in an electrochemical cell.

The electrochemically active substance may be an electrochemically active element, alloy, substance, composition, or mixture which is capable of reacting electrochemically when coupled with a compatible electrode in the presence of a compatible electrolyte in a cell, and which:

(a) comprises or includes one or more elements selected from the group consisting of the halogens, the alkali metals, the alkaline earth metals, the first and second series of transition elements, lead, phosphorous, arsenic, antimony, bismuth and aluminium; or
(b) comprises oxygen, sulphur or selenium or a composition containing oxygen, sulphur or selenium; or
(c) comprises a composition of carbon, boron, silicon, or nitrogen with an element or substance selected from the elements or substances of (a) and (b) above.

The invention also extends to an electrode for an electrochemical cell, whenever made according to the method as described above.

In the following example, Example 2, the pellets according to Example 1 were impregnated with sulphur and used as a replacement for a conventional carbon felt/sulphur cathode in a sodium/sulphur cell.

EXAMPLE 2

Pellets according to the present invention were made according to Example 1, and containing 9,5 mass % graphite. They were, after curing and dehydration, impregnated with sulphur at 240°–320° C. for two weeks in a sealed glass vessel.

Figure 2:
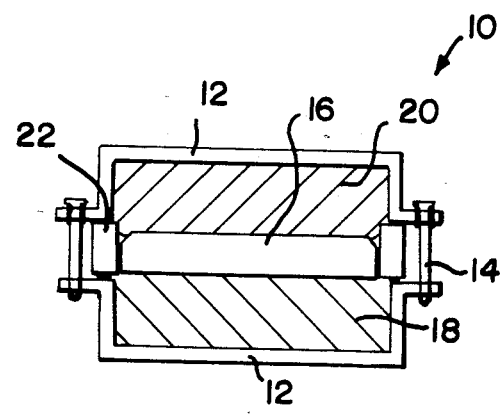
FIG. 2 shows a sectional side elevation of a flat plate cell described in EXAMPLE 2.

The pellets so formed and a control cathode in the form of a conventional carbon felt/sulphur cathode (Le Carbone type RVC 2000) were installed as cathodes in identical flat plate cells of the type shown in FIG. 2, in which the diagrammatic drawing shows a sectional side elevation of the flat plate cells in question.

In FIG. 2 reference numeral 10 generally designates the cell which comprises two stainless steel cups 12 held together by insulated bolts 14 and clamped to an alpha-alumina collar 22. A beta-alumina solid electrolyte disc 16 glassed on to the alpha-alumina collar 22 separates the cathode 18 from a sodium anode 20.

Each cell was filled with a 200% Faradaic excess of sodium.

The RVC 2000 carbon felt control electrode was prepared by immersing compressed felt in molten sulphur and in the cell containing the pellet according to the present invention, the pellet was covered by a thin (less than 1 mm thick) layer of similarly prepared RVC 2000 felt.

Calculations, based on the degree of filling of the zeolite cages in the 13X zeolite, as estimated according to the method of Barrer and Whiteman (J. Chem. Soc. (A)(1967) pages 13–18) showed that about half the sulphur in the pellet had been sorbed into the porous interior of the zeolite crystals in the pellet.

Figure 3:
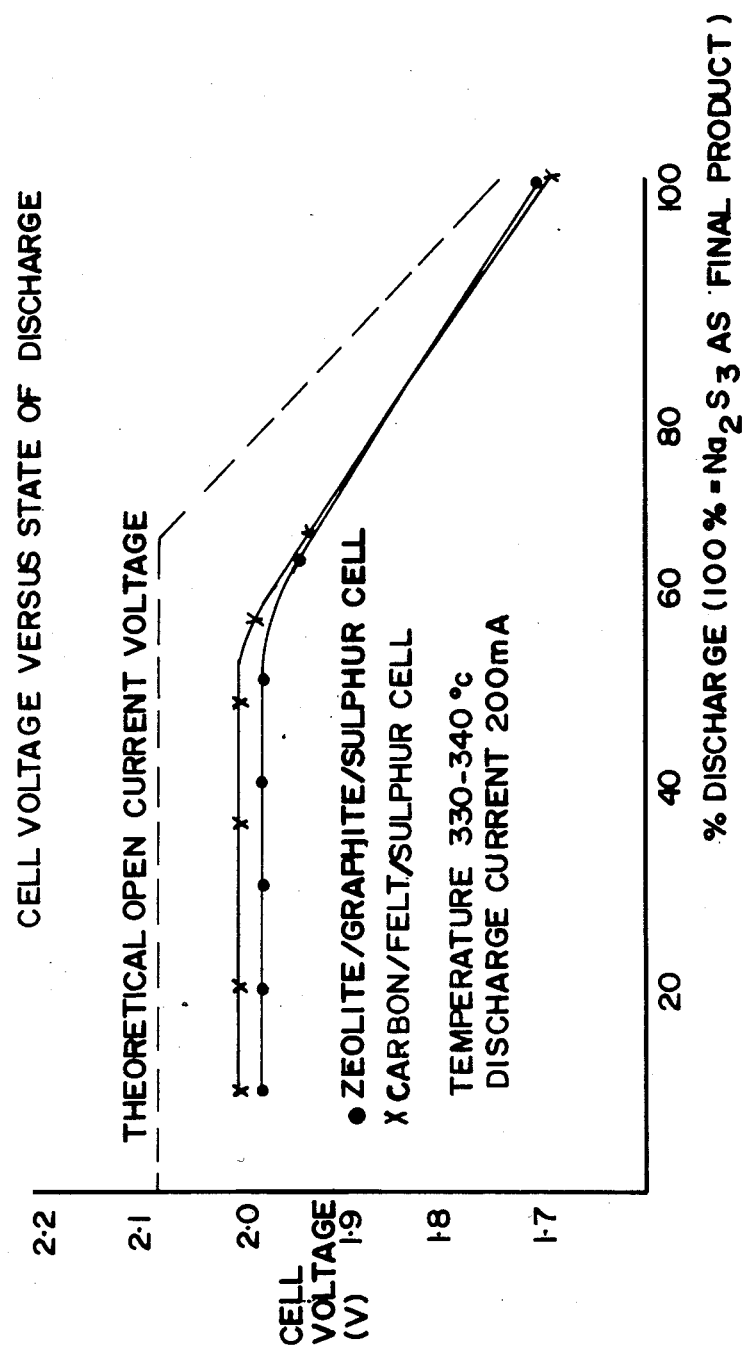
FIG. 3 depicts a plot of cell voltage against state of discharge for the two cells described in EXAMPLE 2.

The performance of the two cells is recorded in FIG. 3, which is a plot of cell voltage against state of discharge (100% discharge corresponding to $Na_2S_3$ as final product). Both cells were discharged at a current of 200 mA corresponding to a current density of about 50 $mAcm^{-2}$ at a working temperature of 330°–340° C.

The internal resistance of each cell was calculated using the potential drop from open current voltage on load at start of discharge and was found to be:

|  | Internal Resistance (ohms) |
| --- | --- |
| Sulphur/Zeolite/Graphite Pellet | 0,50 |
| Carbon Felt/Sulphur Cathode | 0,40 |

As the cells had a similar internal resistance, this suggested that in respect of conductivity, the pellet is comparable with the conventional carbon felt cathodes used in this type of cell.

EXAMPLE 3

In this example zeolite 4A crystals in accordance with the invention were prepared.

Once again, a solution was prepared in an unused polyethylene beaker containing 100 g $Na_2SiO_3.9H_2O$ and 100 ml triethanolamine in 700 ml distilled water. To this solution was added various proportions of Aquadag, as in the case of Example 1. However, in this case, a second solution was prepared containing 80 g $NaAl_2.3H_2O$ and 100 ml triethanolamine in 700 ml distilled water. Seed crystals were omitted.

Once again the first solution was vigorously stirred while the second solution was slowly added thereto, with stirring being continued for a period of 5 minutes after the addition. The gel so formed showed a pH of about 14. In each case the beaker was again covered with a polyethylene film to prevent rapid evaporation of the water and subsequently placed in a temperature-controlled water bath at 70° C. for a period of 14 days to complete zeolite crystal growth. Once again the resulting crystals were black in appearance and no free graphite or residual graphite deposits were noticed. Yields of 25 to 26 g of zeolite 4A /graphite crystals were obtained, the average crystal size being about 20 microns. X-ray diffraction spectra of the products showed mainly zeolite 4A peaks.

This example serve to show that the method of the invention is equally applicable to various types of synthetic tectosilicates and can easily be applied to any such tectosilicates.

When the artifacts of the invention are used as electrodes, and a suitable organic binder is chosen which cracks to form carbon which has an open microporous active carbon structure, this structure can itself sorb electrochemically active substances and pin them within the pores at the operating temperature of the cell, to complement the sorbing action of the tectosilicate. If desired, during formation of the artifact, the mixture of binder and crystals may be compacted around a current collector, for example a rod of carbon or of a transition metal carbide or a bundle of graphite fibres or the like. The cracking of the binder will then result in a rigid, solid artifact that has good mechanical and electrical contact with the current collector.

The electrode and the making thereof may involve the addition of a very finely divided refractory hard metal compound powder to the crystal/binder mixture, the binder being selected so that when this mixture is cracked, the hard metal compound particles will be held rigidily in a finely dispersed form, by a microporous active carbon structure formed from the cracked binder. In this form, the bound powder particles can significantly improve the electrical conductivity of the electrode artifact.

In this regard it will be appreciated that in certain electrochemical systems certain of the intermediate refractory hard metal compounds will be electrochemically inert, whereas in others they will be electrochemically active, and contribute to cell capacity. The intermediate refractory hard metal compounds contemplated in this regard will in general comprise at least one metal selected from the group consisting in chromium, manganese, iron, cobalt and nickel, with at least one non-metal selected from the group consistng in carbon, boron, nitrogen, oxygen, silicon, phosphorous, germanium and hydrogen, although other metals from the first, second and third series can be employed. The hard metal powder may be in a halogenated condition, or may be halogenated in situ in the artifact. Generally carbides are preferred from the point of view of cost.

When the powder incorporated with the binder is electrochemically active and acts to improve electrode capacity, it may for example be a transition metal sulphide, eg. FeS, $FeS_2$, $TiS_2$, $MoS_2$, or a transition metal oxide such as $Fe_3O_4$, $Fe_2O_3$, $MnO_2$, $NiO_2$ or the like.

The tectosilicate crystals and artifacts of the invention can also be used in an undoped form in electrical storage cells. In this case the electrochemically active material can be mixed with the binder, and the role of the tectosilicate would be that of a scavenger of any unwanted by-products of side reactions.

When the tectosilicate crystals and artifacts of the present invention are used to form an electrode in an electrochemical cell, the electrode may be in the form of an anode for an electrochemical cell.

In this embodiment of the invention, the electrochemically active substance may conveniently be in the form of an electropositive substance comprising or including an alkali metal, a combination of alkali metals, an alkaline earth metal, a combination of alkaline earth metals, a combination or alloy of alkali and alkaline earth metals, or an alloy or composition containing alkali and/or alkaline earth metals.

Where the electropositive substance comprises an alkali metal, it may be in the form of any alkali metal but conveniently lithium, sodium or potassium.

Where the electropositive substance comprises a combination of alkali metals, it may be in the form of a combination of two or more of the alkali metals.

Where the electropositive substance comprises an alkaline earth metal, it may conveniently, for example, be in the form of calcium or magnesium.

Where the electropositive substance comprises a combination of alkaline earth metals, it may comprise a combination of two or more of the alkaline earth metals.

Where the electropositive substance comprises a combination or alloy of alkali and alkaline earth metals, it may be in the form of a combination of one or more alkali metals with one or more alkaline earth metals in any desired proportions.

Where the electropositve substance comprises an alloy or composition containing alkali and/or alkaline earth metals, one or more of the alkali and/or alkaline earth metals may be included in the alloy or composition, and the remaining constituent of the alloy or composition may comprise any compatible metal or similar substance which can form a suitable alloy or composition with the alkali and/or alkaline earth metal.

Thus, for example, the remaining constituent may comprise silicon, aluminium, boron or the like.

Since the mass of the anode is often a factor of importance, in such instances the remaining constituent would preferably be a light metal or substance such as aluminium or silicon.

Applicants believe that from practical and economic considerations, alkali metals and alkaline earth metals such as rubidium, cesium, strontium, barium and beryllium, would not be preferred because of their cost and scarcity, because of the toxicity of beryllium, and because of the high equivalent weights of the substances other than beryllium.

In an alternative embodiment of the invention, the electrode may be in the form of a cathode for a cell.

In this embodiment of the invention the electrochemically active substance may, for example, be in the form of an electronegative substance comprising a halogen, a mixture of halogens, or an interhalogen compound.

The electronegative substance may thus, for example, comprise fluorine, chlorine, bromine or iodine, a mixture of two or more of these halogens, or an interhalogen compound such as BrCl, ICl, IBr or the like.

In an alternative embodiment of the invention, where the electrochemically active substance comprises or includes one or more members of the group comprising the transition elements, the substance may be in elemental form, or in the form of an alloy, composition, mixture or combination including a transition element.

In this embodiment of the invention the electrochemically active substance may, for example, comprise or include a transition element halide, sulphide, selenide, oxide, or the like.

Conveniently, for example, the electrochemically active substance may be selected from one or more members of the group comprising the first series of transition elements (from Sc to Zn) rather than the second series of transition elements (from Y to Cd) because of the lower equivalent weights of the first series.

In a specific embodiment of the invention the transition element may comprise or include Cr, Fe, Mn, Ti or V. In this embodiment of the invention, the electrode may be used either as an anode or a cathode by pairing it with an appropriate compatible electrode in a cell.

In an alternative embodiment the electrochemically active substance may comprise aluminium or phosphorous, or an alloy or composition including aluminium or phosphorous. In an example of this embodiment of the invention, the substance may conveniently be in the form of an aluminium or phosphorous halide, sulphide, selenide, oxide or the like.

Where the electrochemically active substance is a transition element and the electrodes are to be used in electrochemical cells where the charging processes are associated with the transfer of halide ions to the cathode either from the anode or the electrolyte, the electrodes may be activated by applying a voltage above the threshhold voltage for halogenation of the transition metals or transition metal compounds of the electrodes.

The electrodes may be activated in situ where the threshhold voltage is below the electrolysis voltage of the electrolyte.

If the threshhold voltage is above the break-up voltage of the electrolyte of the cell, the electrodes may be activated separately or together in cells with appropriate electrolytes.

The activated electrodes may be loaded into cells in their charged, partially charged, or discharged states.

The invention further extends to an electrochemical cell including a pair of compatible electrodes and a compatible electrolyte, at least one of the electrodes comprising an electrode as hereinbefore described.

Where only one of the electrodes is in the form of an electrode as hereinbefore described, the remaining electrode may be in the form of any compatible electrode.

Thus, in one example of the invention, the remaining electrode may be in the form of an anode comprising or including an alkali metal, a combination of alkali metals, an alkaline earth metal, a combination of alkaline earth metals, a combination or alloy of alkali and alkaline earth metals, or an alloy or composition containing alkali and/or alkaline earth metals.

In an alternative example of the invention, the remaining electrode may be in the form of a cathode comprising or including an electronegative substance which is held captive for effective operation in a cell by being in the form of a suitable alloy, compound or element.

In an alternative example of the invention, the remaining electrode may be in the form of an anode or a cathode, and may comprise or include a transition metal or transition metal compound, alloy or composition.

A cell in accordance with this invention may conveniently have both electrodes in the form of electrodes comprising electronically conductive tectosilicates as hereinbefore described.

The electrolyte of the cell may be in the form of a solid electrolyte, an electrolyte which is liquid at the operating temperature of the cell, or an electrolyte comprising an electrolyte sorbed or impregnated in a suitable molecular sieve carrier.

In an embodiment of the invention, the molecular sieve carrier may thus conveniently be in the form of dehydrated or partially dehydrated zeolite crystals, or an artifact formed therefrom.

In an embodiment of the invention the electrolyte may comprise a source of disassociated metal and halide ions.

Thus, for example, the electrolyte may include alkali metal or alkali earth metal halide salts such as sodium chloride, calcium chloride, calcium fluoride, magnesium chloride, lithium bromide or the like.

In an alternative embodiment of the invention, the electrolyte may comprise binary, ternary etc. salt mixtures of alkali metal and/or alkaline earth metal halide salts.

Thus, for example, the electrolyte may comprise lithium iodide-potassium iodide, lithium chloride-potassium chloride, lithium chloride-magnesium chloride, lithium bromide-potassium bromide, lithium fluoride-rubidium fluoride, lithium chloride-lithium fluoride, calcium chloride-lithium chloride and the like.

In an alternative embodiment of the invention, the electrolyte may comprise an alkali metal halide or alkaline earth metal halide electrolyte dissolved in an aprotic solvent.

The aprotic solvent may be any suitable solvent such as, for example, propylene carbonate or the like.

In an alternative embodiment of the invention, the electrolyte, for example, molten alkali metal halide salts, may be doped with an aluminium halide (e.g. $AlCl_3$) or with some other suitable dopant to reduce the melting point of the electrolyte.

Thus, for example, the electrolyte may be in the form of an alkali metal halide-aluminium halide mixture or a double salt or may be in the form of an alkaline earth halide-aluminium halide mixture or a double salt or a mixture thereof.

Thus, for example, the electrolyte may comprise $NaAlCl_4$; $LiAlCl_4$; $KAlCl_4$; $NaAlBr_4$; $LiAlBr_4$; $KAlBr_4$; $NaAlI_4$; $LiAlI_4$; $KAlI_4$; $Mg(AlCl_4)_2$; $Ca(AlCl_4)_2$; $Mg(AlBr_4)_2$; $Ca(AlBr_4)_2$; $Mg(AlI_4)_2$; $Ca(AlI_4)_2$, or the like.

Where the electrolyte is a mixture or a melt it may conveniently be an eutectic mixture or melt.

In an example of the invention a cell in accordance with this invention may be formed in which the anode comprises lithium or sodium in porous form, lithium or sodium sorbed into a molecular sieve carrier such as zeolite crystals or a lithium-aluminium alloy or a lithium-silicon alloy.

In this example of the invention, the cathode may be in the form of a transition element halide which is sorbed into an electronically conductive tectosilicate, such as zeolite crystals, according to the present invention.

The transition element halide may be in the form of cobalt chloride, iron chloride, chromium chloride, titanium chloride or manganese chloride.

In forming the cathode of this example, the zeolite crystals may be formed as described above to contain colloidal Aquadag, and may be dehydrated or at least partially dehydrated, and may be doped using conventional techniques which are applicable to the electrochemically active substance in question. Thus, for example, $FeCl_3$ could be impregnated directly into zeolite crystals either from the liquid or vapour phases. Iron carbonyl could be sorbed into dehydrated zeolite and then pyrolysed to iron. Thereafter the iron could be chlorinated prior to use or chlorinated prior to charging. In an alternative example, where the electrochemically active substance is chromium chloride, chromium could be sorbed into the zeolite crystals as a low melting point chromium oxide, and then reduced to chromium metal with hydrogen. Thereafter the chromium could be chlorinated prior to use or, where the electrolyte phase is suitable, it could be chlorinated during charging.

Applicants believe that cathodes in accordance with the examples given, will be in the form of three dimensional cathodes wherein the transition elements are sorbed into the tectosilicate, and will be held captive in the tectosilicate during normal operation of a cell incorporating such a cathode in a highly dispersed and electrochemically reactive state. Therefore, in favourable circumstances, each ion of the transition element should be able to take on a high oxidation state thereby allowing for utilisation of its full electrochemical potential.

In selecting the electrochemically active substance for the cathode, it would be advantageous to select the lightest materials with the highest possible negative oxidation potentials which can be sorbed into the molecular sieve carrier in a highly dispersed state, and which can be held captive in the tectosilicate during normal operation of the cell at the operating temperatures for which the cell is designed, to allow the cell to operate effectively for a sufficient period.

In this example of the invention the electrolyte phase may be any convenient electrochemically compatible electrolyte phase.

In selecting the electrolyte the following factors would tend to be of importance:
the electrolyte should have a low melting point, should be non-corrosive and non-toxic, should be compatible with the anode and cathode, should have a low density, a high specific conductivity, and the highest possible decomposition potential, and should be chemically and thermally stable under operating conditions.

In this example of the invention the electrolyte may conveniently be in the form of a lithium-aluminium-chloride eutectic melt which has a melting point of about 100° C. Alternatively, the lithium-aluminium-chloride melt may be doped with various alkali metal halides or alkali earth halides to reduce the melting point below 100° C.

Applicants believe that in this example of the invention the lithium-aluminium-chloride electrolyte has the advantages that it has a low melting point, that it is compatible with cathodes such as transition metal chloride cathodes, that it is compatible with appropriate anodes, that it is compatible with tectosilicates such as zeolites, and that it is inexpensive.

Applicants believe that the relatively low electrolyte melting point could permit the use of cheaper and lighter cell casings than would otherwise be possible, and the use of relatively unsophisticated heating systems.

These aspects can provide substantial savings in terms of costs and power/weight considerations.

Cells in accordance with this invention can have application both as primary cells, and as secondary or rechargeable cells.

However, certain cells in accordance with this invention will generally tend to be effective only as primary cells.

Although the present invention has been described with particular reference to the use of electronically conductive tectosilicates according to the present invention in electrochemical storage cells, as this is contemplated to be the field of major use therefor, it will be appreciated that the invention is useful, as mentioned above, in any application where an electronically conductive tectosilicate is desirable.

I claim:

1. A method of making an electrode for an electrochemical cell which comprises precipitating a tectosilicate selected from the group consisting of zeolites, felspathoids, felspars and silica gel from a solution which has an electronically conductive species selected from the group consisting of carbon, the transition metal chalcogenides, intercalation compounds of carbon and intercalation compounds of said chalcogenides in colloidal form in suspension therein, so that the colloidal particles of the electronically conductive species are trapped within the framework structure of the precipitate, and sorbing an electrochemically active electrode substance which comprises one or more elements selected from the group consisting of the halogens, the alkali metals, the alkaline earth metals, the first and second series of transistion elements, lead, phosphorous, arsenic, antimony, bismuth, aluminium, oxygen, sulphur and selenium into the internal volume of the tectosilicate, so that the electrochemically active substances is sorbed and held captive therein dispersed form for effective use in an electrochemical cell.

2. A method as claimed in claim 1, in which the electrochemically active substance is an electrochemically active element, alloy substance, composition, or mixture which is capable of reacting electrochemically when coupled with a compatible electrode in the presence of a compatible electrolyte in a cell, and which:
   (a) comprises or includes one or more elements selected from the group consisting of the halogens, the alkali metals, the alkaline earth metals, the first and second series of transition elements, lead, phosphorous, arsenic, antimony, bismuth and aluminium; or
   (b) comprises oxygen, sulphur or selenium or a composition containing oxygen, sulphur or selenium; or
   (c) comprises a composition of carbon, boron, silicon, or nitrogen with an element or substance selected from the elements or substances of (a) and (b) above.

3. An electrode for an electrochemical cell, whenever made according to the method as claimed in claim 1.

4. A method of making an electrode for an electrochemical cell which comprises precipitating a tectosilicate having in its interior a multiplicity of arrays of molecular cavities which are interconnected and which open out of the surface of the tectosilicate via pores, from a solution which has an electronically conductive species in colloidal form in suspension therein, so that the colloidal particles of the electronically conductive species are entrapped within the framework structure of the precipitate and enhance the electronic conductivity of the precipitate, and sorbing an electrochemically active electrode substance into the internal volume of the tectosilicate, so that the electrochemically active substance is sorbed and held captive therein in dispersed form for effective use in an electrochemical cell, the tectosilicate being selected from the group comprising zeolites, felspathoids, felspars and silica gel.

5. A method as claimed in claim 4, in which the tectosilicate is selected from the group consisting in zeolites and felspathoids.

6. A method of making an electrode for an electrochemical cell which comprises precipitating a tectosilicate having in its interior a multiplicity of arrays of molecular cavities which are interconnected and which open out of the surface of the tectosilicate via pores, from a solution which has an electronically conductive species in colloidal form in suspension therein, so that the colloidal particles of the electronically conductive species are entrapped within the framework structure of the precipitate and enhance the electronic conductivity of the precipitate, and sorbing an electrochemically active electrode substance into the internal volume of the tectosilicate, so that the electrochemically active substance is sorbed and held captive therein in dispersed form for effective use in an electrochemical cell, the electronically conductive species being selected from the group comprising carbon, the transition metal chalcogenides, intercalation compounds of carbon and intercalation compounds of said chalcogenides.

7. A method as claimed in claim 6, in which the electronically conductive species is selected from the group comprising graphite, $MoS_2$, $TiS_2$, $TaS_2$, $CrS_2$, $ZrSe_2$ and $TiSe_2$.

8. A method as claimed in claim 1, in which the colloidal particles have a particle size of not more than 1 micron.

9. A method as claimed in claim 1, in which the solution is an aqueous solution.

10. A method as claimed in claim 1, which comprises, after precipitating the tectosilicate from the solution and prior to sorbing the electrochemically active substance into the internal volume of the tectosilicate, compacting a plurality of particles of said tectosilicate under pressure to form a unitary artifact.

11. A method as claimed in claim 10, in which the compacting is by isostatic or uniaxial pressing of a mixture of the tectosilicate particles together with a particulate binder.

12. A method as claimed in claim 11, in which the binder is an organic binder which cokes at a temperature sufficient to drive any bound water out of the tectosilicate particles, the method comprising, after the pressing, firing the compacted tectosilicate under a vacuum or inert gas at a temperature and for a period sufficient to crack the binder and to drive any bound water out of the tectosilicate, but insufficient to cause any substantial breakdown of the tectosilicate structure.

13. A method of making an electrode for an electrochemical cell which comprises selecting from the group consisting of zeolites, felspathoids, felspars and silica gel a tectosilicate which has trapped within and forming part of its framework structure at the molecular or atomic level, colloidal particles of one or more electronically conductive species selected from the group consisting of carbon, the transition metal chalcogenides, intercalation compounds of carbon and intercalation compounds of said chalcogenides, which act to render the tectosilicate electronically conductive, and sorbing an electrochemically active electrode substance which comprises one or more elements selected from the group consisting of the halogens, the alkali metals, the alkaline earth metals, the first and second series of transition elements, lead, phosphorous, arsenic, antimony, bismuth, aluminium, oxygen, sulphur and selenium into the internal volume of the tectosilicate for the electrochemically active substances to be held captive therein for effective use in an electrochemical cell.

14. An electrode for an electrochemical cell, the electrode comprising a tectosilicate selected from the group consisting of zeolites, felspathoids, felspars and silica gel which has trapped within and forming part of its framework structure at the molecular or atomic level, colloidal particles of one or more electronically conductive species selected from the group consisting of carbon, the transition metal chalcogenides, intercalation compounds of carbon and intercalation compounds of said chalcogenides, which act to render the tectosilicate electronically conductive, and which has an electrochemically active electrode substance which comprises one or more elements selected from the group consisting of the halogens, the alkali metals, the alkaline earth metals, the first and second series of transition elements, lead, phosphorous, arsenic, antimony, bismuth, aluminium, oxygen, sulphur and selenium sorbed into the internal volume of the tectosilicate for the electrochemically active substances to be held captive therein for effective use in an electrochemical cell.

15. A method as claimed in claim 4 in which the electrochemically active electrode substance is selected from the group consisting of the halogens, the alkali metals, the alkaline earth metals, the first and second series of transition elements, lead, phosphorous, arsenic, antimony, bismuth, aluminium, oxygen, sulphur and selenium.

16. A method as claimed in claim 6, in which the electrochemically active electrode substance is selected from the group consisting of the halogens, the alkali metals, the alkaline earth metals, the first and second series of transition elements, lead, phosphorous, arsenic, antimony, bismuth, aluminium, oxygen, sulphur and selenium.

* * * * *